United States Patent [19]

Kroner et al.

[11] Patent Number: 5,548,036
[45] Date of Patent: Aug. 20, 1996

[54] PREPARATION OF POLYMERS OF ASPARTIC ACID AND THEIR USE

[75] Inventors: Matthias Kroner, Eisenberg; Heinrich Hartmann, Limburgerhof; Gunnar Schornick, Neuleiningen; Richard Baur, Mutterstadt; Birgit Potthoff-Karl, Ludwigshafen; Volker Schwendemann, Neustadt; Alexander Kud, Eppelsheim, all of Germany

[73] Assignee: BASF Aktiengesellschaft, Ludwigshafen, Germany

[21] Appl. No.: 464,624

[22] PCT Filed: Dec. 21, 1993

[86] PCT No.: PCT/EP93/03641

§ 371 Date: Jun. 26, 1995

§ 102(e) Date: Jun. 26, 1995

[87] PCT Pub. No.: WO94/15993

PCT Pub. Date: Jul. 21, 1994

[30] Foreign Application Priority Data

Jan. 2, 1993 [DE] Germany .................... 43 00 020.7

[51] Int. Cl.$^6$ .................... C86G 69/08; C86G 69/10; C86G 73/10; C86G 73/06
[52] U.S. Cl. .................... 525/419; 525/420; 528/328; 528/363; 562/553; 427/388.4; 134/2; 134/4; 134/7; 134/13; 527/314
[58] Field of Search .................... 562/553; 525/419, 525/420; 528/328, 363; 427/388.4; 134/2, 4, 7, 13; 527/314

[56] References Cited

U.S. PATENT DOCUMENTS 5,284,512  2/1994  Koskan et al. .................... 106/416
5,373,088  12/1994  Koskan et al. .................... 528/363
5,399,750  3/1995  Brun et al. .................... 562/553

OTHER PUBLICATIONS

Derwent Abstracts 73-49652U, "Maleic Acid Monoamide Preparation".
Journal of Medicinal Chemistry, vol. 16, pp. 893–897, (1973).
Archives of Biochemistry and Biophysics, vol. 86, 280–285, (1960).
The Journal of Organic Chemistry, vol. 26, pp. 1084–1091, (Jan.–Apr. 1961).
The Journal of the American Chemical Society, vol. 74, pp. 5304–5306, (Oct. –Dec. 1952).
Polymer Bulletin, vol. 1, pp. 177–180, (1978–1979).
Nature, vol. 163, pp. 213, 214 (1949).
Nature, vol.190, pp. 531–532, (Apr. 1, 1961 to Jun. 24, 1961).
Journal of the American Chemical Society, vol. 80, pp. 1523–2697, (Apr. 11, 1958).

*Primary Examiner*—Frederick Krass
*Attorney, Agent, or Firm*—Oblon, Spivak, McClelland, Maier, & Neustadt, P.C.

[57] ABSTRACT

Process for the preparation of polymers of aspartic acid by reacting (a) maleic anhydride and (b) ammonia and/or primary or secondary amines without diluent in the (a):(b) molar ratio of 1:0.1 to 1:3 to give monoamides of maleic acid, fumaric acid or their ammonium salts at up to 100° C. and subsequent condensation of the reaction products, with or without compounds capable of cocondensation, at above 100° C. and, where appropriate, hydrolysis of the condensates and use of the polymers as scale inhibitor, as dispersants for pigments and as additive to detergents and cleaners.

8 Claims, No Drawings

PREPARATION OF POLYMERS OF ASPARTIC ACID AND THEIR USE

The present invention relates to a process for preparing polymers of aspartic acid by thermal condensation of monoamides of maleic acid, fumaric acid or the ammonium salts of the monoamides of these acids, in the presence or absence of compounds capable of cocondensation, and to the use of the polymers as scale inhibitors, as dispersants for pigments and as additive to detergents and cleaners.

Polyaspartic acid and condensates of aspartic acid with other amino acids are known.

Thus, for example, Nature 163 (1949) 213 describes the formation of high molecular weight condensation products on heating aspartic acid at 200° C. J. Amer. Chem. Soc. 74(1952) 5304 and 5307 disclose the thermal polycondensation of aspartic acid/glutamic acid mixtures in the presence of phosphoric acid.

Arch. Biochem. Biophys. 86 (1960) 281–285 describes the polycondensation of amino acid mixtures composed of 2 parts of glutamic acid, 2 parts of aspartic acid and one part of a mixture of other amino acids in the presence of phosphoric acid at over 100° C. Proteinoids are obtained in increasing yields and with higher molecular weights as the condensation temperature increases. The proteinoids contain 10–30 mol-% glutamic acid units. The glutamic acid units are mainly located at the chain ends. The molecular weights may reach 35000.

According to the Journal of the Americal Chemical Society 80 (1958) 2694, purely thermal treatment of glutamic acid results almost quantitatively in pyroglutamic acid which is incapable of polycondensation.-However, polycondensates which contain glutamic acid units can be prepared by copolycondensation of glutamic acid and other amino acids.

Nature 190 (1961) 531 and Polym. Bull. 1 (1978) 177–180 describe the thermal polycondensation of L-asparagine and isoasparagine in boiling water to form polyaspartic acids with average molecular weights of up to 3000.

J. Org. Chem. 26 (1961) 1084 describes the polycondensation of N-acetylaspartic acid at 145°–200° C. with elimination of water and acetic acid to form a glassy solid which has been identified as polyaspartimide. This reference also describes the polycondensation of the hydrobromide of aspartic anhydride in pyridine.

A method using phosphoric acid for the polycondensation of DL-aspartic acid is described by Neri in J. Med. Chem. 16 (1972) 893–897. At a phosphoric acid/aspartic acid molar ratio of 0.6 the resulting polyaspartimide has, as a solution in dimethylformamide, a reduced viscosity of 45 ml/g. Subsequent reaction with ethanolamide results in a modified polyaspartic acid which is suitable as plasma expander. The reaction is carried out in dimethylformamide as solvent.

EP-B--0 256 366 discloses a process for preparing polyaspartic acid and its salts in which maleic acid and ammonia are reacted in the molar ratio 1: 1–1.5 at from 125 to 140° C., and the acids are, where appropriate, converted into their salts. It is also possible to use maleic anhydride in the reaction, maleic acid being initially prepared therefrom by addition of water. U.S. Pat. No. 5,057,597 discloses the polycondensation of aspartic acid crystals in an agitated fluidized bed.

It is an object of the present invention to provide a process which can easily be carried out industrially to prepare polymers of aspartic acid.

We have found that this object is achieved by a process for preparing polymers of aspartic acid by thermal condensation of monoamides of maleic acid, fumaric acid or the ammonium salts of the monoamides of these acids, in the presence or absence of compounds capable of cocondensation, wherein (a) maleic anhydride and
(b) ammonia and/or primary or secondary amines are reacted without diluent in the (a):(b) molar ratio of 1:0.1 to 1:3 to give monoamides of maleic acid, fumaric acid or their ammonium salts at up to 100° C., the reaction products are subsequently thermally condensed, with or without compounds capable of cocondensation, at above 100° C., and the condensates are hydrolyzed where appropriate. The reaction of maleic anhydride and ammonia and/or primary or secondary amines is preferably carried out below the melting point of the maleic anhydride or the mixtures of maleic anhydride and the products resulting from the reaction. The condensation of the powdered products of the reaction of (a) and (b) preferably takes place in the form of a powder. It is possible for this to take place in the presence of other powders which are inert under the polymerization conditions.

Maleic anhydride used as component (a) may be, for example, in the form of flakes, briquettes, pellets or granules.

Ammonia and/or primary or secondary amines are used as component (b). Examples of amines are mono- or dialkylamines having 1 to 30 carbon atoms. Individual compounds of this type are methylamine, ethylamine, n-propylamine, isopropylamine, n-butylamine, isobutylamine, pentylamine, hexylamine, octylamine, decylamine, dodecylamine, palmitylamine, stearylamine, dimethylamine, diethylamine, di-n-propylamine, diisopropylamine, di-n-butylamine, dihexylamine and dioctylamine. Apart from ammonia and the amines, it is also possible to use hydroxylamine and hydrazine, as well as ethanolamine, propanolamine, butanolamine, diethanolamine and dipropanolamine.

The reaction of (a) maleic anhydride with (b) ammonia and/or amines is highly exothermic. Whereas this reaction is carried out in the prior art in diluents, by contrast the reaction in the process according to the invention is carried out without diluents. The molar ratio of (a) maleic anhydride to (b) ammonia and/or primary or secondary amines is 1:0.1 to 1:3, preferably 1:0.5 to 1:3.

Maleic anhydride is a strong acylating agent which reacts rapidly with amines. Equimolar amounts of maleic anhydride and ammonia, primary or secondary amines react to give the monoamides of maleic or fumaric acid. Ammonia or amines in more than the stoichiometric amounts result in the ammonium salts of the monoamides of maleic acid or fumaric acid. The reaction of components (a) and (b) can be carried out in multiphase reaction mixtures. Thus, for example, besides a gaseous phase there may be several solid phases present. Examples of solid phases are solid maleic anhydride, ie. the flakes, briquettes, extrudates or granules used for the reaction. In addition, the monoamides of maleic acid or fumaric acid produced in the first stage of the reaction, or their ammonium salts, are solid products under the reaction conditions. As the reaction advances the ratios of amounts of solid phases composed of maleic anhydride and the reaction products may change. Since the reaction of amines with maleic anhydride takes place faster than the formation of salts of maleamic acid with amines, it is possible to prepare ammonium-free maleamic acids with stoichiometric ratios. The free carboxyl group of the maleamic acids may be partially or completely neutralized with ammonia or amines. Since there are several solid products of the reaction, the reaction mixture is normally multiphasic.

The reaction between maleic anhydride and ammonia or the suitable amines takes place on the surface of the solid maleic anhydride. The products of the reaction can be removed, for example, mechanically from the surface of the maleic anhydride particles. This takes place most easily by, for example, the solid reaction mixture being stirred, milled or riddled. This detaches the reaction products from the surface of the solid maleic anhydride so that free maleic anhydride is again present and can react further with ammonia or amines. The heat produced in the reaction is removed through the reactor wall or with the aid of an inert gas. It can also be removed through the surfaces of heat exchanges projecting into the reaction zone. For specific metering of an amine or ammonia, for example, it can be diluted with an inert gas, such as nitrogen, air or carbon dioxide, and allowed to act on solid maleic anhydride. This makes it possible, for example, to avoid local overheating or excessive concentrations of amine or ammonia.

Dilution of the amines or ammonia with an inert gas leads to a reduction in the reaction rate, so that better removal of the heat which is produced is possible. If a gas/solid phase reaction is to be carried out, the temperature must be controlled so that melting of the maleic anhydride is avoided. The temperature must not exceed the melting point of maleic anhydride or of the mixture of maleic anhydride and reaction products. As the reaction advances, the melting point of the mixture rises and may be up to 100° C. at the end of the reaction. If the reaction of components (a) and (b) is to take place without formation of a liquid phase, it is carried out at temperatures below the melting point of maleic anhydride or below the melting point of the mixtures of maleic anhydride and the reaction products.

The reaction is preferably carried out at from 0 to 50° C.

Efficient control of the reaction is also possible by altering the amount of ammonia or amine added.

Surprisingly, input of mechanical energy into the reaction zone is also an effective way of influencing, ie. slowing down or speeding up as required, the reaction rate. Input of mechanical energy into the system leads to continual renewal of the surface of the solid maleic anhydride because the products of the reaction of maleic anhydride and the amines or ammonia which are adhering to the surface are removed, and thus new maleic anhydride surfaces form. The geometry of the maleic anhydride particles and the ratio of surface to volume determine the reaction rate. Any type of solid maleic anhydride can be used in the reaction. For example, maleic anhydride flakes can be placed in an atmosphere of ammonia. The reaction takes place only slowly as long as the flakes are not agitated. The reaction takes several hours or days. However, since the ammonia diffuses into the flakes, the reaction takes place not only on the surface but also in the interior of the solid. Agitation of the flakes greatly increases the reaction rate. The flakes disintegrate during the reaction. The product is in every case a white, free-flowing powder. The diameters of the individual particles range from 5 to 1000, preferably 10 to 500, μm.

Components (a) and (b) can also be reacted in a system in which a liquid phase exists in addition to one or more solid phases. This takes place, for example, by reacting gaseous amines or ammonia with molten maleic anhydride. This reaction is carried out in the range from about 50 to 100° C. In this case, component (b) is added at a rate such that the temperature does not rise above 100° C. Several solid products are formed in the reaction, such as maleamic acid, fumaramic acid or their ammonium salts. After completion of the reaction, the products are in the form of powdered solids, and no liquid phase then exists.

Components (a) and (b) can also be reacted in the gas phase by utilizing the high vapor pressure of maleic anhydride and reacting it in the gas phase with amines and/or ammonia, for example with the aid of a stream of inert gas. The products of this reaction are fine powders which are then subjected, in the second stage, to the polycondensation.

The products of the reaction of components (a) and (b) are thermally condensed at above 100° C. This is essentially a polyaddition reaction. The products depend on the temperature and predominantly contain units of structure I or cyclic structure II:

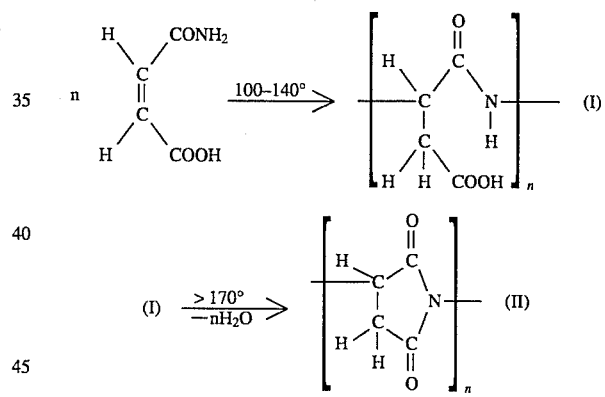

Under certain conditions, the reaction may pass through such intermediates as are known from the polycondensation of asparagine and isoasparagine.

This preferentially takes place when the partial or complete ammonium salts of the monoamides of maleic acid or fumaric acid are used:

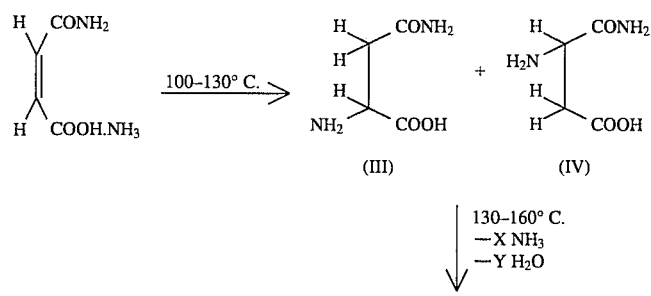

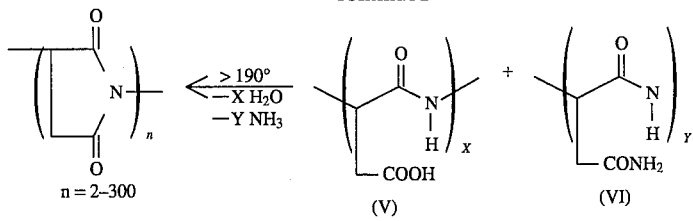

In formulae I and II, n is 2–300. The condensation products above 100°–140° C. are soluble in water and are composed virtually quantitatively of the open-chain form. Depending on the amount of ammonia used, the carboxyl group present in the sidechain of structure I is in the free form, in the form of an ammonium salt or as carboxamide.

Molecular weights were determined by gel permeation chromatography (GPC) with sodium polyacrylates as reference substances. They range from 200 to 30 000, preferably from 400 to 20 000. Weight averages are from 500 to 10 000, preferably from 600 to 5000. The K values of the sodium salts as 1% strength solutions in water at pH 7 are 7–50, preferably 8–30. As the condensation temperature increases there is formation of polycondensates which contain increasing amounts of the cyclic imide form which has structure II and is insoluble in water. The products of condensation at 150° C. comprise, for example, 80–90% of the open form of structure I and 10–20% of the closed form of structure II, whereas at 170° C. the two forms are present in approximately the same proportions. At 190° C., the condensation products contain only about 20–30% of the open form of structure I and 70–80% of the closed form of structure II, while above 190°–240° C. or higher only the imide form of structure II is obtained. Carrying out the condensation under reduced pressure favors formation of polycondensates in the imide form of structure II. For example, the products of condensation under 50 mbar and at 130°–150° C. are ⅔ of the closed form of structure II and only ⅓ of the open form of structure I, whereas at 170°–190° C. under 50 mbar less than 20% is in the open form of structure I. There is a marked decrease in the amount of open-chain products of structure I at condensation temperatures above 160° C. under 50 mbar. Virtually only cyclic imide forms of structure II exist at 200° C. under 50 mbar. The best way to characterize the condensation products is by H-NMR spectroscopy. This method can be used to distinguish the monomers with double bonds from the resulting saturated open-chain and cyclic imide-containing polymers. The following characteristic H-NMR signals are obtained for the products of the reaction of maleic anhydride with ammonia, and the polymeric open form I and the polymeric cyclic form of structure II, in 6-fold deuterated dimethyl sulfoxide:

MA:NH$_3$: 1:2 5.8 (1H, d, J=13.2 Hz) 6.18 (1H, d, J=13.2 Hz) 7.8 (4H, s br) 7.4 (1H, s) 9.5 (1H, s)

MA:NH$_3$: 1:1 6.3 (1H; d, J=13 Hz) 6.5 (1H, d, J=13 Hz) 8.15 (1H, s) 8.55 (1H, s) 14 (1H, s)

Polymeric open form I 2.4 (2H, CH$_2$, s br) 3.8–4.8 ( H, CH, m)

Polymeric cyclic form II 2.3–2.85 (1H, CH$_2$, m) 2.85–3.4 (1H, CH$_2$, m) 4.8–5.4 (1H, CH, m).

The disappearance of the sharp signals for the unsaturated monomers suggests that the residual content of initial monomers is low. The transition from the open polymeric form into the cyclic polymeric form can be observed by the migration of the signals for the CH group from 3.8–4.8 to 4.8–5.4. The contents of open and cyclic forms in the reaction mixtures can be determined from the ratio of these signals.

It is possible by selecting the reaction conditions to obtain polycondensates which, besides polyaspartic acid and polyaspartimide units, also contain polyaspartamide units, evident from broad signals in the H-NMR in the range from 6.5 to 9. The aspartic acids can be linked together in alpha and beta fashion.

The temperature for condensing the products of the reaction of 1 mol of maleic anhydride and 2 mol of ammonia or amines is preferably at least 105° C., whereas a minimum temperature of 120° C. is required for condensing the products of reaction of 1 mol of maleic anhydride and 1 mol of ammonia and/or amines in order to ensure an adequate reaction rate. If long reaction times can be accepted, it is also possible to carry out the condensation in the range above 100° C. up to the abovementioned minimum temperature.

The condensation products in the open-chain form of structure I are soluble in water. The solubility in water can be improved by neutralizing the carboxyl groups by adding bases, eg. alkali metal bases, ammonia, amines or alkaline earth metal bases. The cyclic imide form of structure II is, in general, not soluble in water. It is converted by hydrolysis, by adding bases, into the salt form which is then readily soluble in water.

The polycondensation described above may, however, also take place with initial elimination of water to form maleimide as intermediate, from which polyaspartimide is then formed by polyaddition.

Polymerization of the products of reaction of maleic anhydride with ammonia and/or amines can be carried out by various processes without intermediate purification. Thus, for example, it is possible to heat the products of the reaction of ammonia or amines and liquid or solid maleic anhydride to above 100° C. so that the products initially form a low-viscosity melt. Maintenance of the temperature results within 5–15 minutes in an increase in viscosity with formation of polymeric products. For a limited time, the reaction product is thermoplastic and forms very viscous melts which are difficult to stir and soon polymerize further to a viscous and then to a brittle mass. The reaction mixture thus passes through solid/liquid/solid phase states.

The reaction can be carried out, for example, in a kneader or on a heatable conveyor belt.

The polymerization can also be carried out in the solid phase without passing through a liquid phase. This procedure is advantageous because it is then unnecessary to mix a highly viscous mass. The condensation of the powdered products of the reaction of (a) and (b) is preferably carried out in the presence of other powders which are inert under the polymerization conditions. Inert powders which are preferably used are polymers containing aspartic acid, aspartamide and/or aspartimide units, or monomeric aspartic acid.

Thus, for example, mixtures of the monoamides of maleic acid or of fumaric acid, which melt during the polymerization, or the partially or completely neutralized ammonium salts of these monoamides, with other non-melting powders which are inert under the polymerization conditions are prepared. The content of added non-melting powders can be, for example, 50–99, preferably 60–90, % by weight. Non-melting inert powders which are preferably used are polymers containing aspartimide units. In a continuous 5 polymerization, it is possible for this purpose, for example, to return part of the powdered final products as non-melting powders which are inert under the reaction conditions. Other examples of suitable non-melting powders are sand, glass powder, ceramic powder, steel balls, aspartic acid, clay minerals, amino acids, sheet silicates, zeolite, alumina, amorphous silicates, talc, silica, kieselguhr, alumosilicates, sodium sulfate, titanium dioxide, cement, gypsum, sodium carbonate, potassium carbonate, ion exchange resins, sodium aluminum silicates, sodium phosphates (pentasodium triphosphate), magnesium silicate, carbon, soot, active carbon, molecular sieves, starch, metal oxides, bentonites, silicates and sulfides.

The condensation of the products of the reaction of components (a) and (b) can also be carried out in the presence of compounds capable of cocondensation therewith. Suitable examples thereof are amino acids, carboxylic acids, anhydrides of polybasic carboxylic acids, alcohols, amines, alkoxylated alcohols, alkoxylated amines, aminosaccharides, carbohydrates, saccharide-carboxylic acids and/or non-proteinogenous amino acids. The amounts of compounds capable of cocondensation used are from 0 to 30%, based on one part of the products of the reaction of components (a) and (b).

The polymerization of the products of the reaction of maleic anhydride and ammonia can also be carried out by neutralizing, with bases, the reaction mixtures composed of monoamide of maleic acid or fumaric acid and/or the partial or complete ammonium salts, before the polymerization. Suitable bases may be inorganic or organic in nature. Examples of inorganic bases are alkaline earth metal and alkali metal hydroxides, oxides, carbonates and bicarbonates, for example sodium hyroxide, potassium hydroxide, sodium carbonate, potassium carbonate, sodium bicarbonate, potassium bicarbonate and sodium acetate. Examples of organic bases are primary, secondary or tert. amines. Suitable bases include triethylamine, ethanolamine, diethanolamine, pyridine, methylamine or dimethylamine.

This variant of the process has the advantage that, after the polymerization has taken place, the polymers result directly in anhydrous neutralized form. The product is, for example, sodium, potassium, triethanolammonium or triethylammonium polyaspartate.

Polyaspartic acid in neutralized form is generally readily soluble in water and can be used directly in many industrial sectors.

The polymerization of the alkali metal, alkaline earth metal or ammonium salts can also be carried out as solid-phase reaction by adding inert powders. Powders which are preferably added are those which have a neutral or alkaline reaction. Examples are: sodium silicate, sodium carbonate, potassium carbonate, sodium phosphate, zeolite A, sodium hydroxide, potassium hydroxide, sodium bicarbonate, potassium bicarbonate, calcium oxide and/or calcium hydroxide.

The polycondensation of the products of the reaction of components (a) and (b), with or without the compounds capable of cocondensation therewith, can also be carried out in the presence of acids, for example hydrochloric acid, phosphoric acid, polyphosphoric acids, phosphorous acid, hypophosphorus acid, sulfuric acid, disulfuric acid, sulfur trioxide, sodium bisulfate or potassium bisulfate, mixtures of said acids, eg. mixtures of hydrochloric acid and phosphoric acid or phosphorous acid. It is possible to use per mol of the products of the reaction of components (a) and (b), for example, 0.05–2, preferably up to 1, mol of an inorganic acid or a mixture of such acids. The polymerization results in copolymers with molecular weights of up to 30,000. The molecular weights of the resulting polycondensates are, as a rule, from 300 to 2000, and the average particle size of the polycondensates is from 10 μm to 500 μm.

Any apparatus suitable for handling solids is suitable for reacting solid maleic anhydride with gaseous a/nines. An apparatus of this type is also suitable for the subsequent condensation. It is also possible to use more than one apparatus or a combination thereof. Examples are: rotating tubes, paddle dryers, kneaders, tumblers, agitated fluidized bed, non-agitated fluidized bed, fixed bed, gravity tower, silo, cone mixer with screw, cyclones, screen, vibrating screen and conveyor belts. For example, maleic anhydride can be reacted with ammonia in a fluidized bed. The fine-particle reaction products are discharged by an air separator and can be deposited on filters or cyclones.

The polymers are normally used in the form of the water-soluble products. If the polymers are insoluble in water, because of the content of cyclic units of structure II, the salt form of the condensation products is prepared therefrom by the action of bases, eg. sodium hydroxide solution or ammonia. The salt form is soluble in water. The condensation products are used in the form of the alkali metal or ammonium salts, for example, as additive to low-phosphate detergents (by this is meant detergent and cleaner formulations with a phosphate content not exceeding 25% by weight) and phosphate-free, solid or liquid detergents and cleaners in amounts of up to 20% of the weight of the detergent formulation, as additive to dishwashing compositions or else as scale inhibitor in amounts of about 0.1–1000 ppm based on the aqueous medium to be treated. The condensates can also be used as dispersants for solid inorganic or organic particles in water. Dispersants are used in many branches of the chemical industry.

If, for example, sodium sulfate, sodium aluminum silicate or zeolite is used as inert filler for the polycondensation, the powders produced in this way can be used in detergents and cleaners.

If soot is used as inert powder, the resulting polycondensate powders can be used to disperse coal in water (coal production).

If China clay, chalk or titanium dioxide is used as inert powder, the resulting polycondensate powders can be used in paper manufacture.

If metal oxides, sulfides, silicates or carbonates are used as inert powders, the resulting polycondensate powders can be used directly as dispersants in the flotation and processing of ores.

If sodium silicates or sodium alumosilicates or cement are used as inert powders, the polycondensate powders can be used as cement additives. The dispersants are normally employed in amounts of from 0.05 to 2, preferably 0.1 to 1, % of the weight of the materials to be dispersed.

The polymers prepared in this way can be used in all sectors in which dispersing, nucleating and crystal growth-inhibiting properties are required, eg. in scale inhibition and the dispersion of organic or inorganic pigments. The condensates are biodegradable.

The K values stated in the examples were determined by the method of H. Fikentscher, Cellulose-Chemie, 13 (1932) 48–64 and 71–74 in 1% by weight aqueous solution at 25° C. and pH 7 on the sodium salt 20 of the polymers.

EXAMPLE 1

98 g of maleic anhydride in the form of flakes are introduced into a 11 round-bottomed flask equipped with stirrer, thermometer and a device for operating under nitrogen and heated to 60° to produce a melt. A gentle stream of ammonia (20 liters per hour) is then passed over the clear melt, the temperature of the mixture rising to 65° C. The products of the reaction separate out as solids. The amount of ammonia passed into the reaction mixture is such that the maleic anhydride: ammonia ratio is 1.2–1.6. This takes about 3 hours.

EXAMPLE 2

1000 g of maleic anhydride in the form of flakes are introduced into a 2 liter laboratory kneader and stirred. Then gaseous ammonia (20 l/h) is passed into the apparatus and the temperature is maintained at 20°–40° C. by cooling it if necessary with a heat-exchanger circuit. Care is taken that the temperature remains below the melting point of maleic anhydride during the reaction. Ammonia is passed into the kneader for 7 hours. The result is a fine white powder with the particle size distribution shown in Table 1. The reaction is continued until there are no flakes left in the flask and no more ammonia is taken up. The reaction is completed by raising the temperature to 50° C. for 1 hour.

TABLE 1

| particle size distribution by screen fractionation | |
| --- | --- |
| Mesh width | % by weight |
| greater than 500 μm | 0.5 |
| 100–500 μm | 26.5 |
| 60–100 μm | 14 |
| below 60 μm | 59 |
| | Total: 100% |

H-NMR (400 MHz, $D_6$-DMSO): δ=6.1 (1H, d, J=13.2 Hz); 6.25 (1H, d, J=13.2 Hz); 7.7 (2H, s, br); 9.3 (1H, s, br).

C-NMR (100 MHz, $D_6$-DMSO): δ=129.3 (s, 1H); 135.3 (s, 1H);

167.7 (s, 1H); 167.9 (s, 1H).

EXAMPLE 3 a) Preparation of the powder mixture:

900 g of polyaspartimide are mixed with 100 g of the powder obtained in Example 2 in the dry at 20° C.

b) Polymerization:

200 g of the powder mixture from a) are introduced into a 2 liter laboratory kneader and heated to 150° C. Then 50 g portions of the powder mixture from a) are added to the contents of the kneader at intervals of 30 minutes. The total amount introduced by the end of the experiment is 750 g of powder mixture.

After the end of the polymerization, the polymer is separated from the polyaspartimide by dissolving in water. The polyimide is insoluble in water and remains as powder. The polymer obtained on polymerization of the products of the 40 reaction of maleic anhydride and ammonia has, in the sodium form as a 1% strength solution in water at pH 7, a K value of 12. The weight average molecular weight of the polymer was determined by GPC with poly(sodium acrylate) standards and is 1600.

EXAMPLE 4 a) Preparation of the powder mixture:

700 g of polyaspartimide are mixed in the dry with 300 g of the powder obtained in Example 2.

b) Polymerization 200 g of powder mixture a) are introduced into the 2 liter laboratory kneader which has been preheated to 135° C. Then 50 g portions of powder mixture a) are added every 30 minutes. The total amount is 700 g. The contents of the kneader remain powdery throughout the polymerization period. Water and other volatile constituents are removed from the reaction mixture by passing nitrogen in during the polymerization.

The polymer obtained by polymerization of the reaction products from Example 2 has, in the sodium form at pH 7, a K value of 13, which corresponds to a weight average molecular weight of 1700.

EXAMPLES 5 to 9

In each case 100 g of the product of the reaction of solid maleic anhydride and 0.9–1.2 mol of ammonia from Example 2 are introduced into a 500 ml round-bottomed flask and the flask is evacuated with a water pump. The evacuated flask containing the mixture is immersed in an oil bath preheated to the temperature stated in Table 2 and is left at this temperature under reduced pressure for 5 hours. During this the contents of the flask expand to form a foam.

After venting and cooling, the foam can easily be crushed to form a fine powder. The weight of the resulting powder is indicated in Table 2.

Part of the reaction mixture is dissolved or suspended (depending on the preparation temperature) in water and neutralized to pH 7 with sodium hydroxide solution, and the K value is determined on a 1% strength solution.

TABLE 2

| | Reaction | | H-NMR determination of the proportions of | | | |
| --- | --- | --- | --- | --- | --- | --- |
| Example | temp. [°C.] | Weight [g] | Open form I | Cyclic form II | K value | Weight average molecular weight determined by GPC |
| 5 | 130 | 86.1 | ⅔ | ⅓ | 10.1 | 1660 |
| 6 | 150 | 85 | ⅕ | ⅘ | 10.5 | 1950 |
| 7 | 170 | 80.6 | 1/10 | 9/10 | 10.2 | 2080 |
| 8 | 190 | 77.9 | — | 1 | 12.6 | 2310 |
| 9 | 240 | 71.9 | — | 1 | 12.9 | 2510 |

EXAMPLE 10 (polymerization of the sodium salt)

a) Sodium salt of the monoamide of maleic acid: 100 g of the reaction product from Example 2 are dissolved in 250 g of water and completely neutralized with 172 g of 10% strength sodium hydroxide solution. The resulting solution has a pH of 7.5. The clear solution is evaporated to dryness at 60° C. and 50 mbar in a rotary evaporator. The result is a white, gummy solid which is characterized by H-NMR spectroscopy.

H-NMR (270 MHz, D$_2$O:δ=5.93 (1H, d, J=13.35 Hz); 6.4 (1H, d, J=13.35 Hz)

b) The salt prepared in a) is heated in a 1 liter round-bottomed flask on a rotary evaporator, while passing nitrogen through, initially at 130° C. for 2 hours and then at 200° C. for 2 hours.

A foam forms during this.

The contents of the flask is kept at 200° C. for 2 hours and subsequently cooled. The polymers prepared at 130° C. and 200° C. are investigated by H-NMR spectroscopy. The formation of polymers is evident even at 130° C. However, at 130° C., the remaining monomer content is still about 10%. The polymer prepared at 200° C. is completely free of monomer and shows in the H-NMR (200 MHz, D$_2$O) the signals at δ=2.2–3.1 (2H) and δ=4.2 bis 5.1 (1H) typical of poly(sodium aspartate).

The poly(sodium aspartate) prepared in this way is an anhydrous easily powdered mass which rapidly dissolves in water.

Comparative Example 1

A polymer was prepared as described in Example 1 of EP-B 0 256 366 by dissolving maleic anhydride in hot water to form maleic acid, neutralizing with ammonia and subsequently condensing. The ratio of maleic acid to ammonia was 1:1.

The reaction product contained, according to spectroscopic investigation, 14 mol% of uncondensed fumaric acid. An aqueous solution of the sodium salt of the polymer was prepared by dissolving in water and neutralizing with 10% strength sodium hydroxide solution. The K value in a 1% strength solution in water was 11.5.

Tests of the use of the polymeric products

Clay dispersion (CD) test

Finely milled SPS 151 China clay is used as model of particulate soil. 1 g of clay is vigorously dispersed with the addition of 1 ml of a 0.1% strength solution of the sodium salt of the polyelectrolyte in 98 ml of water in a 100 ml measuring cylinder for 10 minutes. Immediately after the stirring, a 2.5 ml sample is taken from the center of the cylinder and, after dilution to 25 ml, the turbidity of the dispersion is determined using a turbidimeter. Further samples are taken after the dispersion has stood for 30 and 60 minutes, and the turbidity is determined as above. The turbidity of the dispersion is reported in NTU (nephelometric turbidity units). The less sedimentation there is in the dispersion during storage, the higher the measured turbidity is and the greater is the stability of the dispersion. The second physical variable determined is the dispersion constant which describes the time course of the sedimentation process. Since the sedimentation process can be approximately described by a mono-exponential time law, τ indicates the time in which the turbidity falls to 1/e of that at time t=0.

A higher value for τ means a slower sedimentation of the dispersion.

TABLE 3

| Example | Polymer of Example | Turbidity in NTU at | | | τ [min] |
|---|---|---|---|---|---|
| | | t = 0 | t = 30 minutes | t = 60 | |
| 11 | 5 | 740 | 580 | 500 | 159 |
| 12 | 6 | 750 | 600 | 530 | 184 |
| 13 | 7 | 750 | 610 | 530 | 177 |
| 14 | 8 | 750 | 600 | 550 | 230 |
| 15 | 9 | 750 | 600 | 550 | 230 |
| Comp. Ex. 2 | no polymer | 600 | 37 | 33 | 41.4 |
| 3 | Comp. Ex. 1 | 730 | 580 | 450 | 125 |

As is evident from Table 3, the polycondensates prepared by the process according to the invention have better dispersing properties than the polycondensates which can be prepared according to the prior art (Comp. Ex. 1).

Prevention of scaling in the desalination of seawater

In the test, the polymers are investigated as inhibitors of the formation of calcium and magnesium hydroxides and carbonates from simulated seawater. In the desalination of seawater, calcium carbonate and magnesium hydroxide in particular form firmly adherent and interfering deposits on the surfaces of heat exchangers. The formation of barium sulfate is also a serious problem.

The test solution comprises an aqueous salt solution containing:

$Mg^{2+}$ 70° German hardness $Ca^{2+}$ 14° German hardness $CO_3^{2-}$ 70° German hardness This simulated seawater is mixed with 25 ppm of the polymer indicated in Table 4 and pumped through a dynamic circulating apparatus for 3 hours. Samples are taken after 3 hours and are analyzed for the hardness of the water by titrimetry. The deposits forming on the heat exchangers can be calculated from the decrease in the hardness of the water during the test. The deposits on the heat exchanger pipes increase as the hardness of the water sample decreases. The figures for the hardness of the water are listed in Table 4. A high hardness after 3 hours indicates that scale inhibition is good.

TABLE 4

Prevention of scale in the desalination of seawater

| Example | Polymer of Example | Hardness at start [°] | Hardness after 3 hours [°] |
|---|---|---|---|
| 16 | 8 | 84 | 60 |
| Comp. Ex. 4 | no polymer | 84 | 42 |
| 5 | oligomaleic acid ($M_w$ = 4000) | 84 | 50 |

It is evident from Table 4 that polyaspartates prepared according to the invention prevent deposits which are produced by formation of sparingly soluble salts of calcium and magnesium as hydroxides or carbonates.

We claim:

1. A process for preparing polymers of aspartic acid by thermal condensation of monoamides of maleic acid, fumaric acid or the ammonium salts of the monoamides of these acids, in the presence or absence of compounds capable of cocondensation, wherein (a) solid or molten maleic anhydride and (b) ammonia and/or primary or secondary amines are reacted without diluent in the (a):(b) molar ratio of 1:0.1 to 1:3 to give solid phase monoamides of maleic acid, fumaric acid or their ammonium salts at up to 100° C., and the solid phase reaction products are subsequently thermally condensed, with or without compounds capable of a mixture of cocondensation, at above 100° C.

2. A process as claimed in claim 1, wherein the reaction of (a) solid or molten maleic anhydride and (b) ammonia and/or primary or secondary amines is carried out at below the melting point of the maleic anhydride or of a mixture of maleic anhydride and the reaction products.

3. A process as claimed in claim 1, wherein the compounds capable of cocondensation which are used are amino acids, carboxylic acids, anhydrides of polybasic carboxylic acids, alcohols, amines, alkoxylated alcohols, alkoxylated amines, aminosaccharides, carbohydrates, saccharidecarboxylic acids and/or non-proteinogeous amino carboxylic acids.

4. A process as claimed in claim 1, wherein the condensation of the solid phase products of the reaction of (a) and (b) is carried out in the presence of products of the condensation of the products of the reaction of (a) and (b).

5. A process as claimed in claim 3, wherein the condensation of the solid phase products of the reaction of (a) and (b) is carried out in the presence of other powders which are inert under the polymerization conditions.

6. A process as claimed in claim 5, wherein polymers containing aspartimide units are used as inert powders.

7. A process as claimed in claim 2, wherein said compounds capable of co-condensation are amino acids, carboxylic acids, anhydrides of polybasic carboxylic acids, alcohols, amines, alkoxylated alcohols, alkoxylated amines, aminosaccharides, carbohydrates, saccharidecarboxylic acids, non-proteinogeous amino carboxylic acids or mixtures thereof.

8. A process as claimed in claim 2, wherein the condensation of the products of the reaction of (a) and (b) is carried out in the presence of products of the condensation of the products of the reaction of (a) and (b).

* * * * *